United States Patent [19]
Lin et al.

[11] Patent Number: 5,887,486
[45] Date of Patent: Mar. 30, 1999

[54] LOCKING DEVICE FOR A BICYCLE BRAKE SYSTEM

[75] Inventors: Ah-Ping Lin, No. 20, Lane 666, Sec. 2, Chung-Cheng Rd., Chang-Hua City; Jung-Hua Li, Chang-Hua; Kun-Ju Lai, Chang-Hua Hsien, all of Taiwan

[73] Assignee: Ah-Ping Lin, Chang-Hua, Taiwan

[21] Appl. No.: 707,228

[22] Filed: Sep. 13, 1996

[51] Int. Cl.[6] .............................. B62K 23/06; B62L 3/02; B62L 3/06

[52] U.S. Cl. ................................................ 74/489; 74/526

[58] Field of Search ............................. 74/488, 489, 526

[56] References Cited

U.S. PATENT DOCUMENTS

| | | | |
|---|---|---|---|
| 2,472,442 | 6/1949 | Schueler | 74/489 |
| 3,800,618 | 4/1974 | Yoshigai | 74/489 |
| 4,263,818 | 4/1981 | Ozaki | 74/489 X |

*Primary Examiner*—Allan D. Herrmann
*Attorney, Agent, or Firm*—Reinhart, Boerner, Van Deuren, Norris & Rieselbach, s.c.

[57] ABSTRACT

A locking device for use in a bicycle brake system in order to retain a hand-operated brake lever thereof in a braked state includes a locking member of resilient material, and a bearing device for bearing the locking member on the brake lever. The brake system includes a mounting seat fixed on a bicycle handlebar for connecting a brake cable to the brake lever. The brake lever has a first end mounted pivotally to the mounting seat and turnable about a first axis. The locking member includes a pressure bearing portion, a pair of spaced bracing arm portions which extend traversely and respectively from two ends of the pressure bearing portion, and a pair of leg portions which extend inwardly and respectively from the bracing arm portions. The bearing device includes a pair of pivot holes formed in two opposite lateral walls of the brake lever to receive the leg portions therein such that the pressure bearing portion and the leg portions of the locking member are generally parallel to the first axis. The pivot holes are offset from a second axis which is parallel to the first axis so as to permit a first slight deformation of the two bracing arm portions to hold the bracing arm portions in an upright position relative to the brake lever.

1 Claim, 6 Drawing Sheets

LOCKING DEVICE FOR A BICYCLE BRAKE SYSTEM

BACKGROUND OF THE INVENTION

1. Field of the Invention

The invention relates to a locking device, more particularly to a locking device for use in a bicycle brake system to retain a hand-operated brake lever of the brake system in a braked state.

2. Description of the Related Art

A bicycle used in either a circus or acrobatic performance includes a brake system with a hand-operated brake lever that can be retained at a braked state so that an acrobat can perform complex physical acts, such as somersaults and walking along the crossbar of the bicycle.

As illustrated in FIGS. 1, 2A, and 2B, a conventional locking device is shown together with a bicycle brake system 10 which includes a mounting seat 11 which is adapted to be fixed on a handlebar of the bicycle (not shown), and a hand-operated brake lever 12. A pivot 16 extends through holes formed through the first end 12A of the lever 12 and the seat 11, so that the second end 12B of the brake lever 12 can rotate about the pivot 16 in a clockwise direction upon actuation thereof in order to pull a brake cable 20 against the biasing action of the brake system 10, thereby achieving a braking effect. The conventional locking device includes a through hole unit which is formed through the seat 11 and which consists of a small-diameter hole section 112 and a large-diameter hole section 111, a locking bolt 13 inserted into the hole unit and prevented from disengaging from the seat 11 by means of a retainer ring 15 that is disposed in an annular groove of the small-diameter hole section 112, and a coil spring 14 sleeved around the locking bolt 13 so as to bias the latter in such a manner that the small-diameter section 131 of the locking bolt 13 is located in the hole unit while a portion of the large-diameter section 132 is exposed outwardly from the hole unit.

Referring to FIGS. 3A and 3B, when desired, the second end 12B of the lever 12 is pulled toward the handlebar of the bicycle (not shown) so as to rotate the same about the pivot 16 and correspondingly pulling the brake cable 20, thereby spacing a portion of the brake lever 12 adjacent to the first end 12A away from the seat 11. The locking bolt 13 is then pushed into the hole unit of the seat 11, wherein the large-diameter section 132 of the bolt 13 abuts against an abutment face 121 of the lever 12 so as to retain the latter in the braked state, i.e. retaining the lever 12 stationarily relative to the seat 11.

It is time-consuming to drill the hole unit through the seat 11 in order to mount the locking bolt 13 therein.

SUMMARY OF THE INVENTION

The object of this invention is to provide a locking device for use in a bicycle brake system in order to retain a hand-operated brake lever of the brake system in a braked state. Because the locking device obviates the use of a locking bolt, there is no need for drilling a hole unit through a brake-lever mounting seat in the bicycle brake system.

Accordingly, the locking device for use in a bicycle brake system in order to retain a hand-operated brake lever of the brake system in a braked state includes a locking member of resilient material, and means for bearing the locking member on the brake lever. The brake system includes a mounting seat fixed on a handlebar of the bicycle for connecting a brake cable to the brake lever. The brake lever has a first end mounted pivotally to the mounting seat about a first axis so that, when actuated, the brake lever can turn around the first axis in order to pull the brake cable against a biasing action of the brake system. The locking member includes a pressure bearing portion, a pair of spaced bracing arm portions which extend traversely and respectively from two ends of the pressure bearing portion, and a pair of leg portions which extend inwardly and respectively from the bracing arm portions. The bearing means includes a pair of pivot holes formed in two opposite lateral walls of the brake lever to receive the leg portions therein such that the pressure bearing portion and the leg portions of the locking member are generally parallel to the first axis. The pivot holes are offset from a second axis which is parallel to the first axis so as to permit a first slight deformation of the two bracing arm portions to hold the bracing arm portions in an upright position relative to the brake lever.

After the brake lever is pulled toward the handlebar to tense the brake cable, the pressure bearing portion can be pushed around the leg portions to abut against the mounting seat so as to space another portion of the brake lever other than the first end away from the mounting seat, thereby placing the brake lever in the braked state and the bracing arm portions in a second deformation which is bigger than the first slight deformation. Under this condition, in case the lever is actuated again, the pressure bearing portion will disengage from the mounting seat such that the second deformation will restore the bracing arm portions to a position where they are in the first slight deformation.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
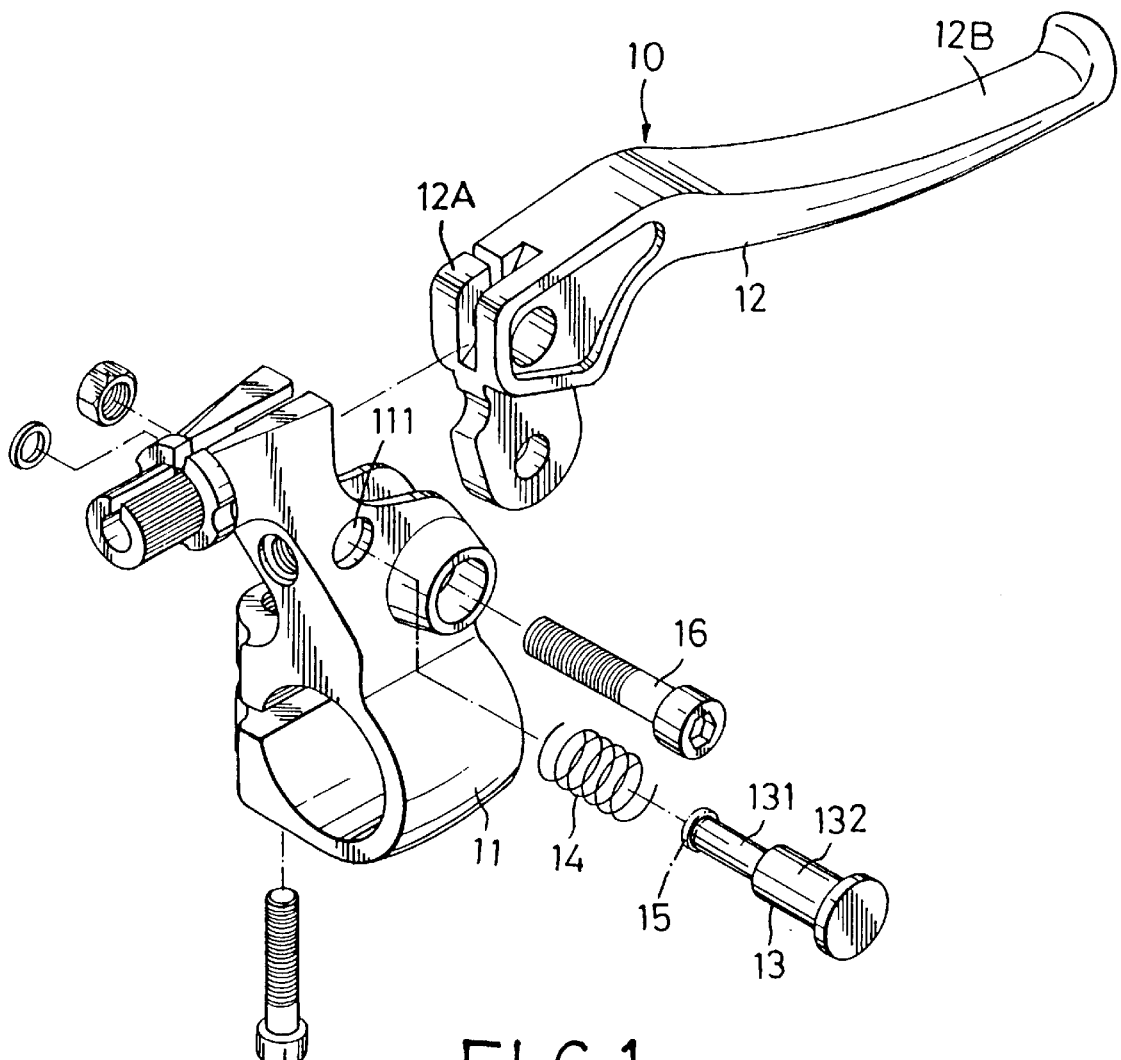
FIG. 1 is a conventional locking device shown together with a bicycle brake system.
Figure 2A:
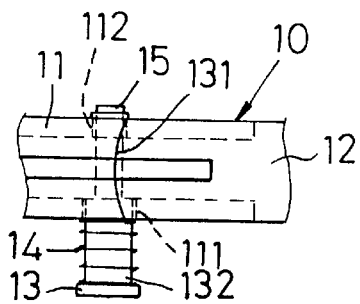
FIGS. 2A and 2B respectively illustrate the conventional locking device fixed on the bicycle brake system for locking a brake lever so as to retain the same in a braked state.
Figure 2B:
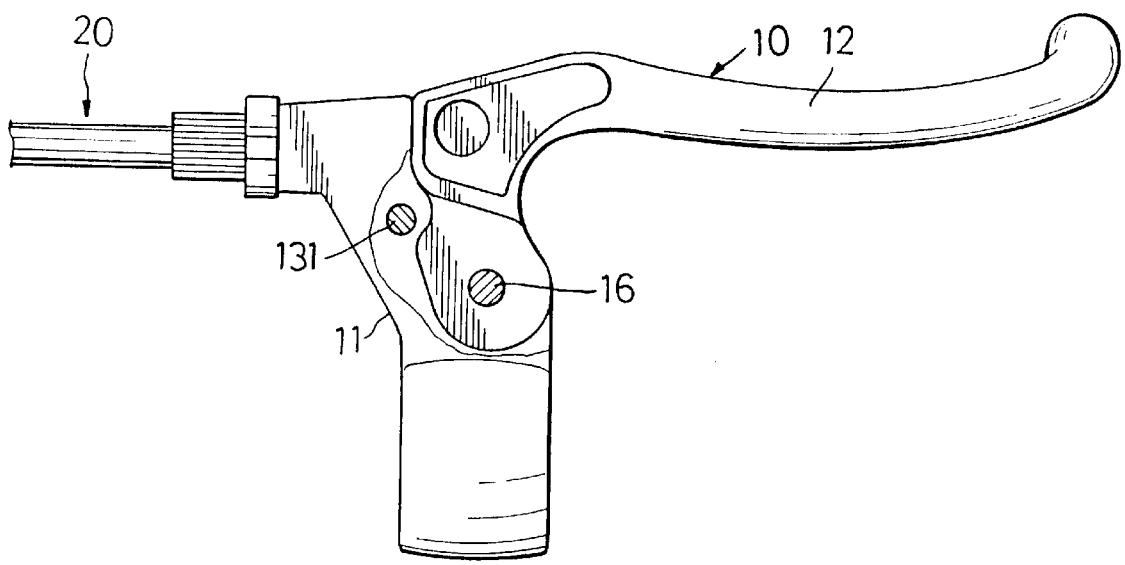
Figure 3A:
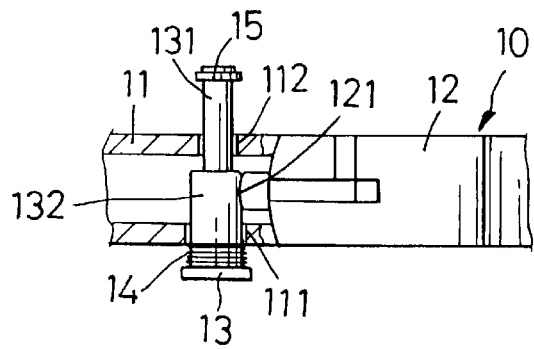
FIGS. 3A and 3B respectively illustrate the conventional locking device fixed on the bicycle brake system, wherein the brake lever is shown in the braked state.
Figure 3B:
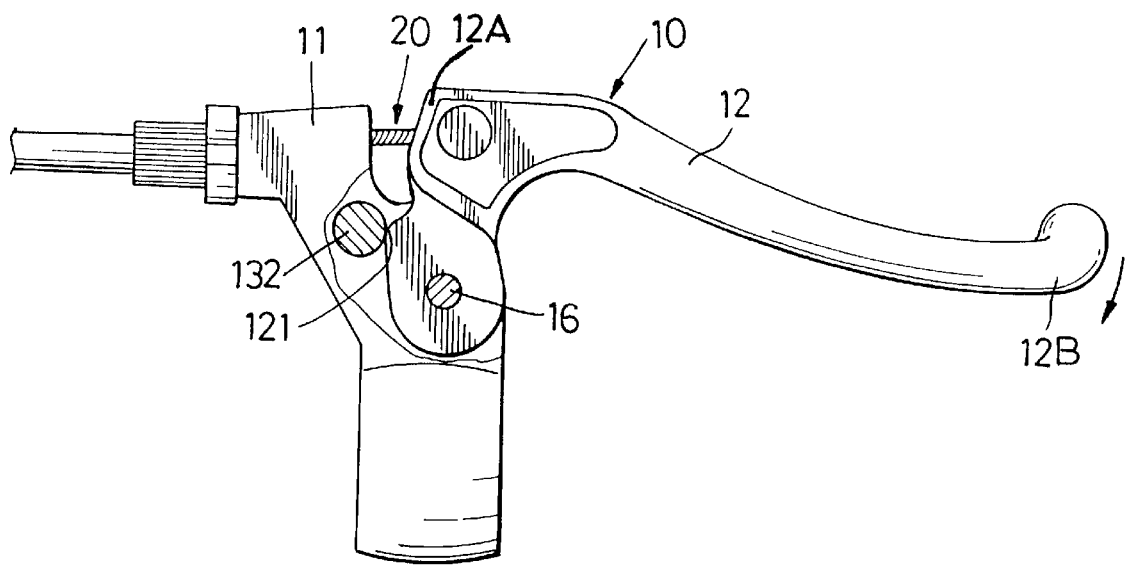
Figure 4:
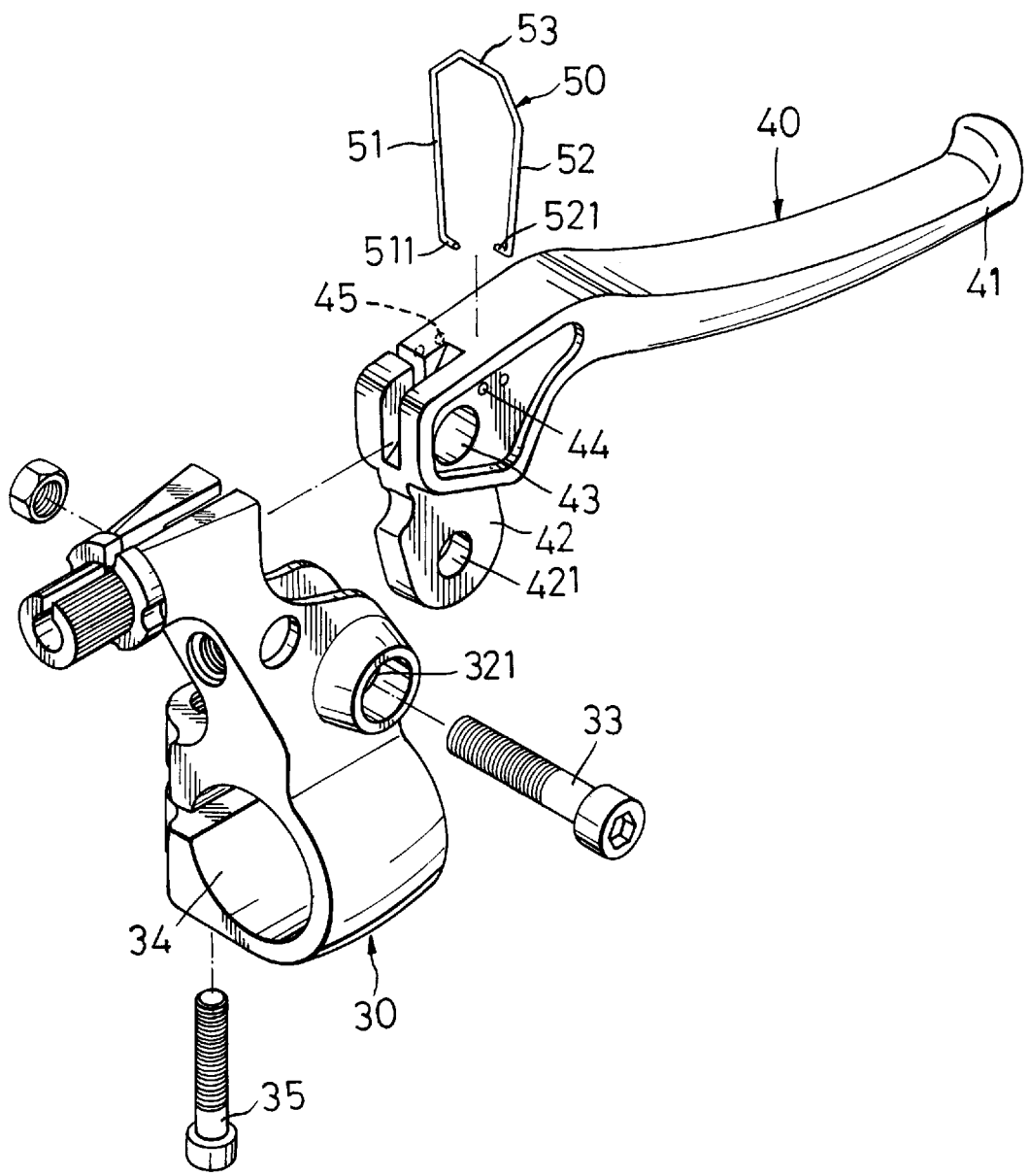
FIG. 4 is a locking device of this invention shown together with a bicycle brake system for locking a brake lever so as to retain the same in a braked state.
Figure 6:
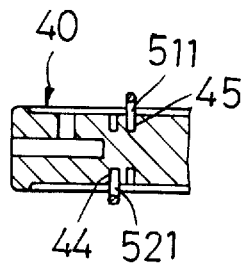
FIGS. 5 and 6 respectively illustrate how the locking device of this invention is fixed in the bicycle brake system.
Figure 5:
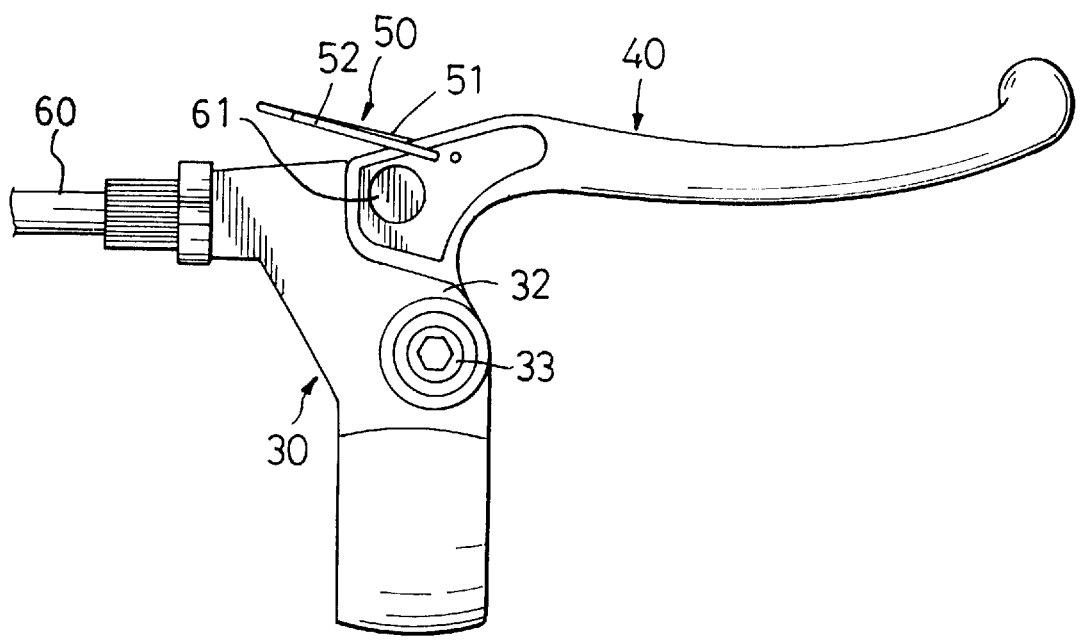

Referring to FIGS. 4, 5 and 6, the preferred embodiment of a locking device 50 of this invention is shown together with a bicycle brake system. The bicycle brake system includes a mounting seat 30 which defines an inner wall 34 therein for being sleeved onto a bicycle handlebar (not shown) and which is fastened by means of a screw 35 so as to fix the seat 11 (see FIG. 1) on the handlebar, an elongated brake lever 40, and a fastening bolt 33 which extends through the hole 321 in the seat 30 and the hole 421 in a front portion 42 of the brake lever 40 so as to connect to the brake lever 40 pivotally on the seat 30 such that the brake lever 40 can rotate about the fastening bolt 33 upon actuation of the lever 40. The brake system further includes a brake cable 60 (see FIG. 5) which has a first end portion provided with a connecting pin 61 inserted into the hole 43 in the front end portion 42 of the brake lever 40, and a second end portion fixed to a brake (not shown) for pulling against a biasing action of the brake system to achieve a braking effect. The connecting pin 61 is parallel to the fastening bolt 33.

The locking device 50 includes a generally U-shaped locking member made of a resilient material, and means for bearing the locking member on the brake lever 40. The locking member includes a pressure bearing portion 53, a pair of spaced apart bracing arm portions 51, 52 which extend integrally and traversely from the pressure bearing portion 53, and a pair of leg portions 511, 521 which extend inwardly and respectively from the bracing arm portions 51, 52.

The bearing means includes a pair of misaligned pivot holes 44, 45 formed in two opposite lateral walls of the brake lever 40 to receive the leg portions 511, 521 therein such that the leg portions 511, 521 and the pressure bearing portion 53 are generally parallel to the fastening bolt 33. Note that the pivot holes 44, 45 are offset from an imaginary horizontal axis which is generally parallel to the fastening bolt 33 so as to permit a first slight deformation of the bracing arm portions 51, 52 to hold the locking member in an upright position relative to the brake lever 40.

Figure 7:
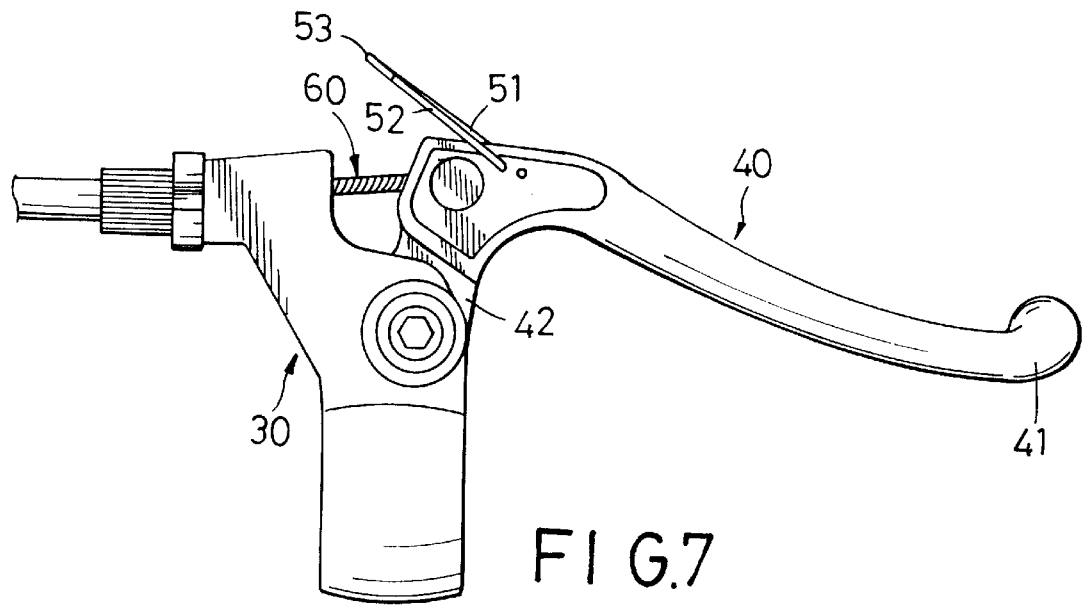
FIGS. 7 and 8 respectively illustrate the locking device of this invention fixed in the bicycle brake system, wherein the brake lever is shown in the braked state.
Figure 8:
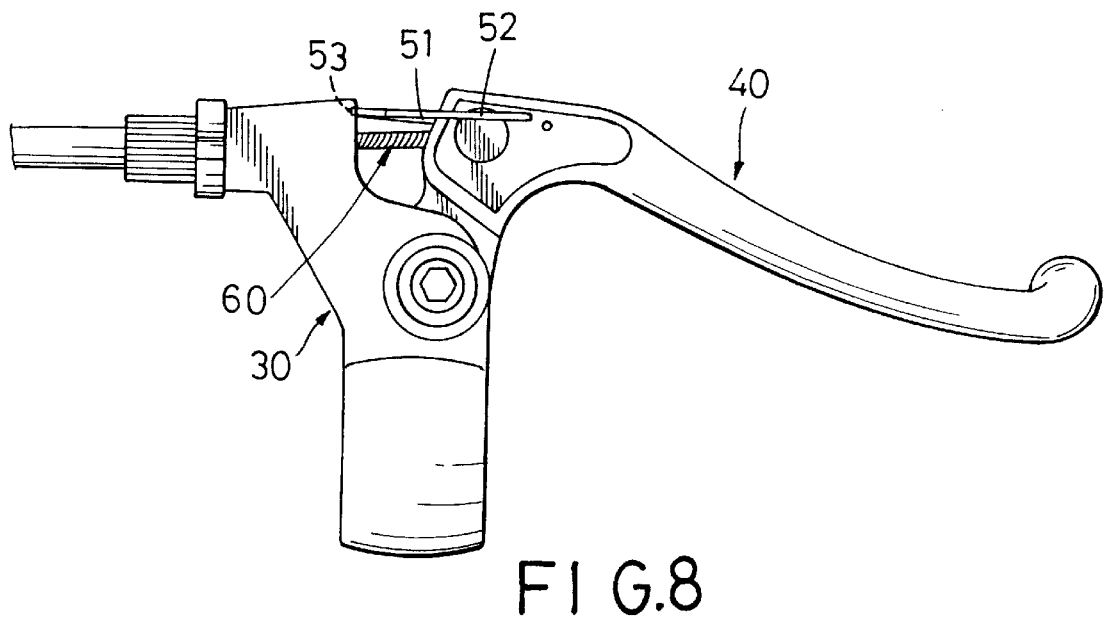

As illustrated in FIGS. 7 and 8, after the second end 41 of the brake lever 40 is pulled toward the handlebar (not shown) so as to tense the brake cable 60, the pressure bearing portion 53 of the locking member can be pushed around the leg portions 511, 521 (see FIG. 4) to press the pressure bearing portion 53 against the mounting seat 30 so as to space a portion of the brake lever 40 other than the first end 42 away from the mounting seat 30, thereby placing the brake lever 40 in the braked state and correspondingly retaining the bracing arm portions 51, 52 in a second deformation which is bigger than the first slight deformation. Under this condition, in case the lever 40 is actuated again, the pressure bearing portion 53 will disengage from the mounting seat 30 such that the second deformation will restore the bracing arm portions 51, 52 to a position where they are in the first slight deformation.

In the embodiment, the fastening bolt 33 (see FIG. 4) serves as an axis about which the brake lever 40 is rotatable.

From the foregoing description, it can be clearly understood that the locking device of this invention is simple in construction and obviates the need for drilling a hole unit through the mounting seat 30 of the bicycle brake system, thereby reducing the time for mounting the locking device in the bicycle brake system.

With this invention thus explained, it is apparent that numerous modifications and variations can be made without departing from the scope and spirit of this invention. It is therefore intended that this invention be limited only as indicated in the appended claims.

We claim:

1. A locking device for use in a brake system of a bicycle in order to retain a hand-operated brake lever of the brake system in a braked state, said brake system including a mounting seat fixed on a handlebar of the bicycle for connecting a brake cable to said brake lever, said brake lever having an end pivoted to said mounting seat about a first axis so that, when actuated, said brake lever is capable of turning around said first axis so as to pull said brake cable against a biasing action of said brake system, said locking device comprising:

a locking member of resilient material including a pressure bearing portion substantially parallel to said first axis, a pair of bracing arm portions spaced apart from each other and extending traversely from said pressure bearing portion, and a pair of leg portions which extend inwardly and respectively from said bracing arm portions; and means for bearing said pair of leg portions including a pair of pivot holes formed in two opposite lateral walls of said brake lever so as to receive said leg portions therein such that said leg portions are generally parallel to said first axis, said pivot holes being offset from a second axis which is parallel to said first axis so as to permit a first slight deformation of said two bracing arm portions to hold said bracing arm portions in an upright position relative to said brake lever, whereby, when said brake lever is pulled toward said handlebar to tense said brake cable, said pressure bearing portion is pushed around said leg portions to abut against said mounting seat so as to space a portion of said brake lever other than said end away from said mounting seat, thereby placing the brake lever in the braked state and correspondingly retaining said bracing arm portions in a second deformation which is bigger than said first slight deformation; and whereby, immediately upon actuation of said brake lever to cause said pressure bearing portion to disengage from said mounting seat, said second deformation will restore said bracing arm portions to a position where said two bracing arm portions are in said first slight deformation.

\* \* \* \* \*